US010012112B2

(12) United States Patent
Walters et al.

(10) Patent No.: US 10,012,112 B2
(45) Date of Patent: Jul. 3, 2018

(54) APPARATUS FOR MOUNTING A COMPONENT IN A GAS TURBINE ENGINE

(71) Applicant: ROLLS-ROYCE PLC, London (GB)

(72) Inventors: Edward Alexander Walters, Derby (GB); Matthew John Willshee, Nottingham (GB); Rachel Moore, Derby (GB)

(73) Assignee: ROLLS-ROYCE plc, London (GB)

( * ) Notice: Subject to any disclaimer, the term of this patent is extended or adjusted under 35 U.S.C. 154(b) by 215 days.

(21) Appl. No.: 14/844,576

(22) Filed: Sep. 3, 2015

(65) Prior Publication Data

US 2016/0090867 A1    Mar. 31, 2016

(30) Foreign Application Priority Data

Sep. 29, 2014  (GB) .................................. 1417123.5

(51) Int. Cl.
| | |
|---|---|
| F01D 25/24 | (2006.01) |
| F01D 25/28 | (2006.01) |
| F02C 7/20 | (2006.01) |
| F02C 7/32 | (2006.01) |

(52) U.S. Cl.
CPC ............. *F01D 25/28* (2013.01); *F01D 25/24* (2013.01); *F02C 7/20* (2013.01); *F02C 7/32* (2013.01); *F05D 2220/32* (2013.01); *F05D 2240/20* (2013.01); *F05D 2240/35* (2013.01); *F05D 2250/322* (2013.01); *F05D 2260/4031* (2013.01); *F05D 2300/603* (2013.01); *Y02T 50/672* (2013.01)

(58) Field of Classification Search
CPC . F01D 25/24–25/285; F02C 7/20; F02C 7/32; F05D 2220/32; F05D 2240/20; F05D 2240/35; F05D 2250/322; F05D 2260/4031; F05D 2300/603; Y02T 50/672
USPC .................................. 415/214.1, 200, 182.1
See application file for complete search history.

(56) References Cited

U.S. PATENT DOCUMENTS

| 2006/0101804 A1* | 5/2006 | Stretton .................... F02C 7/32 |
| | | 60/226.1 |
| 2010/0150706 A1* | 6/2010 | Xie .......................... B29C 70/88 |
| | | 415/200 |
| 2012/0222396 A1 | 9/2012 | Clemen |

(Continued)

FOREIGN PATENT DOCUMENTS

| EP | 1 008 738 A2 | 6/2000 |
| EP | 2 420 652 A2 | 2/2012 |

(Continued)

OTHER PUBLICATIONS

Feb. 15, 2016 Search Report issued in European Patent Application No. 15183648.

(Continued)

*Primary Examiner* — Laert Dounis
*Assistant Examiner* — Kelsey Stanek
(74) *Attorney, Agent, or Firm* — Oliff PLC

(57) ABSTRACT

Apparatus for mounting a component in a gas turbine engine, the apparatus comprising: a casing for a gas turbine engine, the casing including a flange; a first connector to connect a component of the gas turbine engine to the casing at a first location adjacent to the flange; and a second connector to connect the component of the gas turbine engine to the casing at a second location adjacent to the flange.

9 Claims, 6 Drawing Sheets

(56) References Cited

U.S. PATENT DOCUMENTS

| | | | |
|---|---|---|---|
| 2014/0013769 A1* | 1/2014 | Martin | F02C 7/20 60/796 |
| 2014/0174252 A1 | 6/2014 | Davis et al. | |
| 2016/0032755 A1* | 2/2016 | Beutin | F02C 7/32 415/122.1 |

FOREIGN PATENT DOCUMENTS

| | | | | |
|---|---|---|---|---|
| FR | 2 923 542 A1 | 5/2009 | | |
| FR | 2 927 954 A1 | 8/2009 | | |
| FR | 2927954 A1 * | 8/2009 | ............. | F01D 25/28 |
| FR | 3003323 A1 * | 9/2014 | ................ | F02C 7/32 |
| WO | 2014/011982 A1 | 1/2014 | | |
| WO | 2014/100817 A1 | 6/2014 | | |

OTHER PUBLICATIONS

Mar. 2, 2015 Seach Report issued in GB Patent Application No. 1417123.5.

* cited by examiner

APPARATUS FOR MOUNTING A COMPONENT IN A GAS TURBINE ENGINE

TECHNOLOGICAL FIELD

The present disclosure concerns apparatus for mounting a component in a gas turbine engine. In some examples, the apparatus is for mounting an accessory gearbox in a gas turbine engine.

BACKGROUND

Gas turbine engines may be used to provide thrust and/or power generation. For example, an aircraft may include at least one gas turbine engine to provide thrust to the aircraft and to enable the aircraft to fly. Gas turbine engines may also drive auxiliary devices such as power generators, or hydraulic units. A gearbox is therefore often mounted to the external casing of the engine to transmit drive from the engine to the auxiliary devices.

BRIEF SUMMARY

According to various, but not necessarily all, embodiments of the invention there is provided apparatus for mounting a component in a gas turbine engine, the apparatus comprising: a casing for a gas turbine engine, the casing including a flange; a first connector to connect a component of the gas turbine engine to the casing at a first location adjacent to the flange; and a second connector to connect the component of the gas turbine engine to the casing at a second location adjacent to the flange.

According to various, but not necessarily all, embodiments of the invention there is provided apparatus for mounting a component in a gas turbine engine, the apparatus comprising: a casing for a gas turbine engine, the casing including a locally reinforced section; a first connector to connect a component of the gas turbine engine to the casing at a first location adjacent to the locally reinforced section; and a second connector to connect the component of the gas turbine engine to the casing at a second location adjacent to the locally reinforced section.

The casing may have a substantially circular cross section, the first and second locations may be on opposing sides of the casing and define a chord there between.

The first and second connectors may be oriented to form tangents with the casing at the first location and second location respectively.

The casing may have a longitudinal axis, the first location and/or the second location may be within five centimeters of the flange along the longitudinal axis of the casing.

The casing may have a first end and an opposite second end, the flange may be positioned at the second end of the casing.

The apparatus may further comprise a first bracket connected to a body of the casing and to the flange of the casing, the first connector may be connected to the flange and to the body of the casing via the first bracket.

The first and second connectors may be arranged to connect the component to the casing without an intervening mount rail.

The casing may be a fan casing for a gas turbine engine.

The casing may comprise a composite material.

The casing may be a core engine casing for housing at least a high pressure compressor, combustion equipment, and a high pressure turbine.

The apparatus may further comprise a component of the gas turbine engine, the component being connected to the casing via at least the first and second connectors.

The component may comprise a gearbox for the gas turbine engine.

According to various, but not necessarily all, embodiments of the invention there is provided a gas turbine engine comprising an apparatus as described in any of the preceding paragraphs.

The skilled person will appreciate that except where mutually exclusive, a feature described in relation to any one of the above aspects of the invention may be applied mutatis mutandis to any other aspect of the invention.

BRIEF DESCRIPTION

Embodiments of the invention will now be described by way of example only, with reference to the Figures, in which.

DETAILED DESCRIPTION

In the following description, the wording 'contact', 'abut', 'connect' and 'couple', and their derivatives, mean operationally contacting, abutting, connecting and coupling. It should be appreciated that any number of intervening components may exist, including no intervening components.

Figure 1:
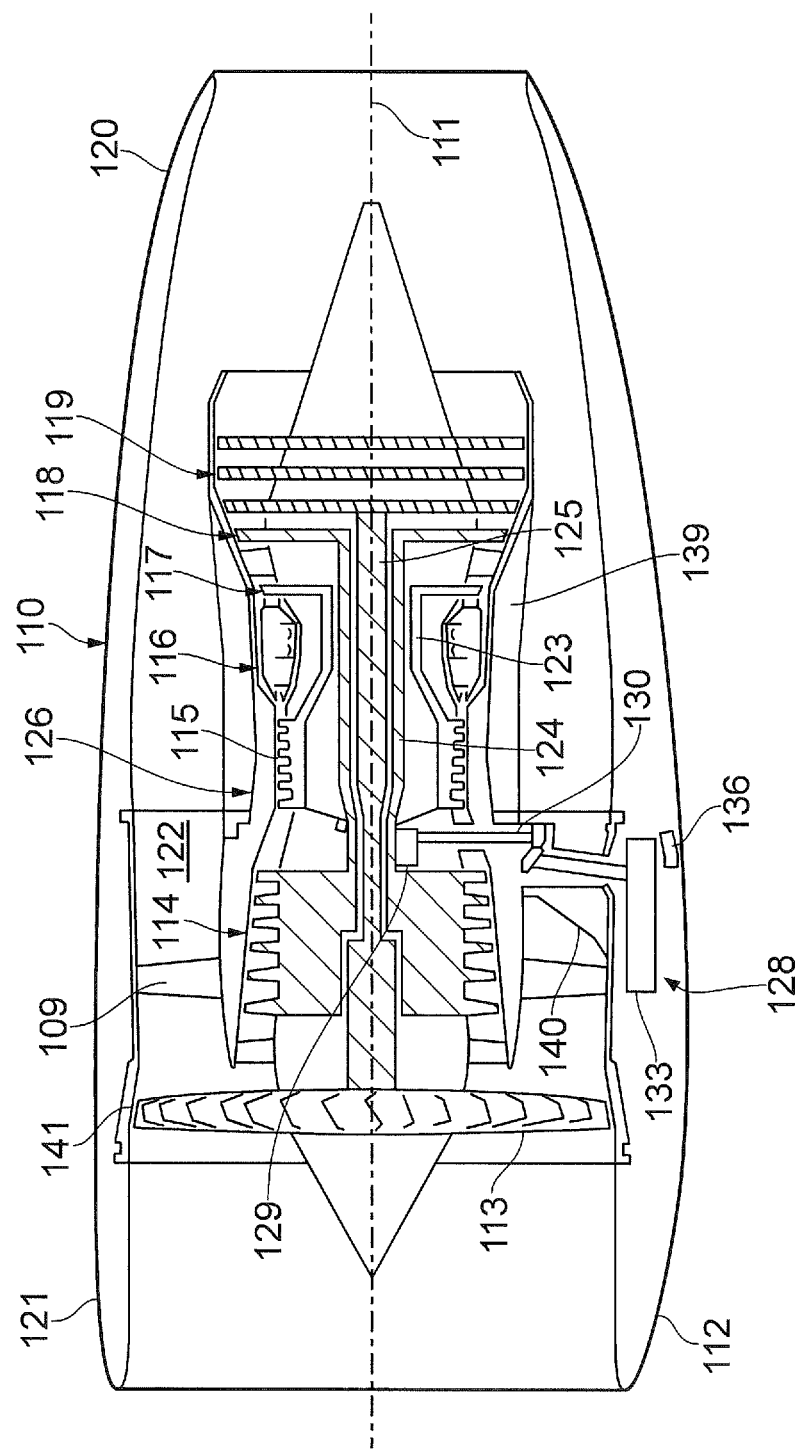
FIG. 1 illustrates a schematic cross sectional side view of a gas turbine engine according to various examples.

FIG. 1 illustrates a cross sectional side view of a gas turbine engine 110. The gas turbine engine 110 has a principal and rotational axis 111 and comprises, in axial flow series, an air intake 112, a propulsive fan 113, and a core engine 126 itself comprising an intermediate pressure compressor 114, a high-pressure compressor 115, combustion equipment 116, a high-pressure turbine 117, an intermediate pressure turbine 118, a low-pressure turbine 119 and an exhaust nozzle 120. A nacelle 121 generally surrounds the gas turbine engine 110 and defines both the intake 112 and the exhaust nozzle 120.

In operation, air entering the intake 112 is accelerated by the fan 113 to produce two air flows: a first air flow into the core engine 126 and on through the intermediate pressure compressor 114 and a second air flow which passes through a bypass duct 122 to provide propulsive thrust. The intermediate pressure compressor 114 compresses the air flow directed into it before delivering that air to the high pressure compressor 115 where further compression takes place.

The compressed air exhausted from the high-pressure compressor 115 is directed into the combustion equipment 116 where it is mixed with fuel and the mixture is combusted. The resultant hot combustion products then expand through, and thereby drive the high, intermediate and low-pressure turbines 117, 118, 119 before being exhausted through the nozzle 120 to provide additional propulsive thrust. The high, intermediate and low-pressure turbines 117, 118, 119 respectively drive the high and intermediate pressure compressors 115, 114 and the fan 113 by associated interconnecting shafts 123, 124, 125.

The fan 113 is circumferentially surrounded by a structural member in the form of a fan casing 141, which is supported by an annular array of outlet guide vanes 109 spanning between a casing 139 that surrounds the core engine 126.

The engine 110 further comprises a gearbox/generator assembly 128 to provide mechanical power for engine or airframe uses. Mechanical power from the gearbox assembly 128 may be consumed by generators to produce electrical power, or consumed by fluid pumps for hydraulics, fuel and engine oil. The generated electrical power may be used for engine start up and for generating electricity once the engine has been started. The generated electricity may be used for engine and associated aircraft electrical accessories. The gearbox/generator assembly 128 may be drivingly connected to the high pressure shaft 123 or to the intermediate pressure shaft 124 via a drive train 130.

In this example, the gearbox/generator assembly 128 comprises an internal gearbox 129 connecting a first drive shaft to the intermediate pressure shaft 124, a second drive shaft and an external gearbox 133 (which may also be referred to as an accessory gearbox) drivingly connected to the second drive shaft. The external gearbox 133 is drivingly connected to a generator. The generator and the external gearbox 133 are mounted on the fan casing 141 and housed within the nacelle 121. The first drive shaft and the second drive shaft are housed within a bypass duct splitter fairing 140.

The gearbox 133 and driven accessories 136 are arranged circumferentially about the fan casing 141 and generally at the bottom of the engine 110. Other engine accessories 136 may also be mounted on the fan casing 141.

Figure 2:
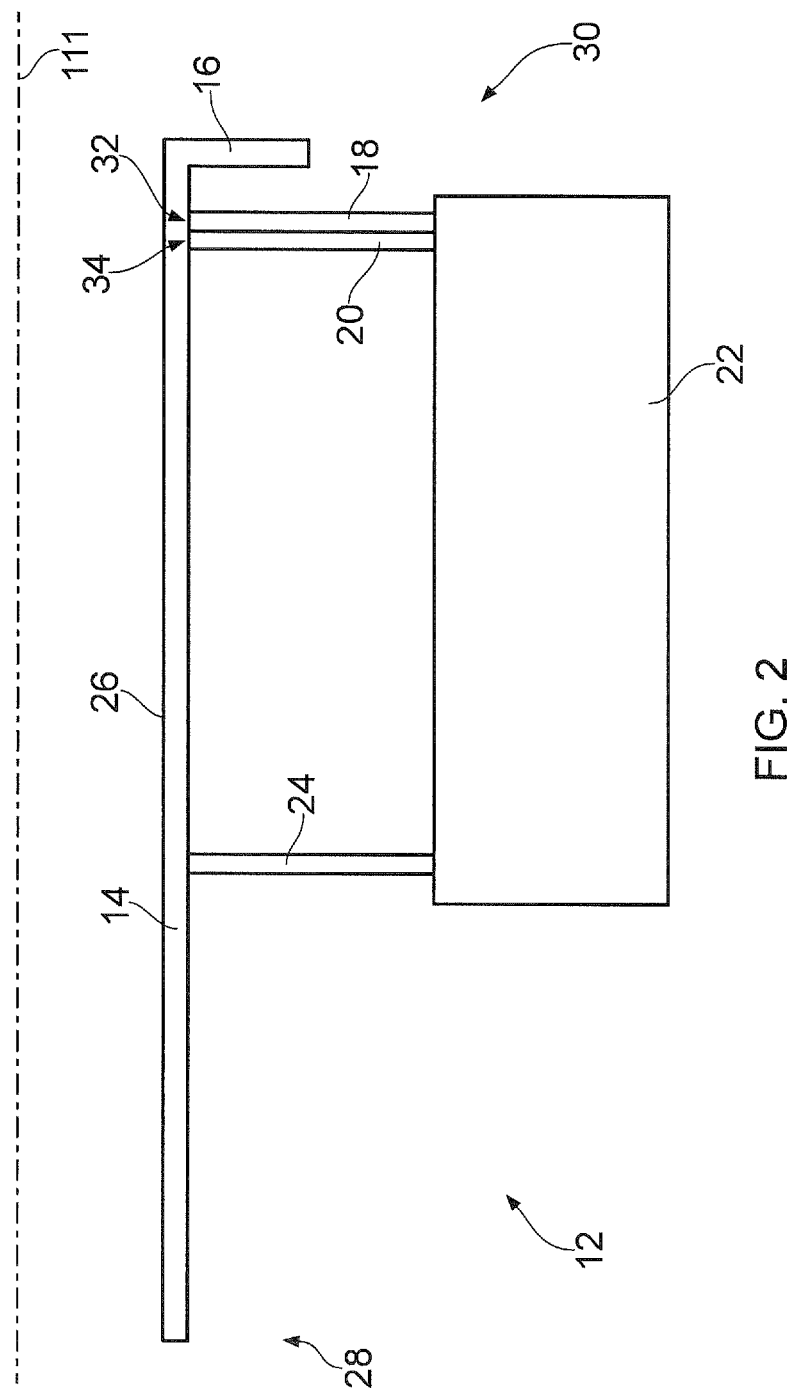
FIG. 2 illustrates a schematic cross sectional side view of apparatus for mounting a component in a gas turbine engine according to various examples.

FIG. 2 illustrates a schematic cross sectional side view of apparatus 12 for mounting a component in a gas turbine engine according to various examples. The apparatus 12 includes a casing 14 including a flange 16, a first connector 18, a second connector 20, a component 22 and may include a third connector 24. FIG. 2 also illustrates the rotational axis 111 of the gas turbine engine 110.

In some examples, the apparatus 12 may be a module. As used herein, the term 'module' means a component or a part that may be assembled with further components or parts by an end manufacturer to form an end product. For example, where the apparatus 12 is a module, the apparatus 12 may include the casing 14, the first connector 18 and the second connector 20, however, the component 22 and the third connector 24 may be assembled by another manufacturer.

The casing 14 may be any suitable casing for mounting a component 22 of the gas turbine engine 110. For example, the casing 14 may be the fan casing 141, the core engine casing 139, or an engine mount ring. The casing 14 includes a body 26 and the flange 16, and has a first end 28 and an opposite second end 30. When the casing 14 is assembled in the gas turbine engine 110, the first end 28 is positioned in closer proximity to the fan 113 than the second end 30.

The casing 14 may comprise any suitable material, and may comprise, for example, a composite material such as carbon fibre reinforced plastic, or may comprise at least one metal such as titanium alloy, steel, or aluminium alloy.

The body 26 is oriented parallel to the rotational axis 111 of the gas turbine engine 110. Where the casing 14 is the fan casing 141 or the core engine casing 139, the body 26 defines a substantially cylindrical shape having a longitudinal axis aligned with the rotational axis 111. Alternatively, the body 26 may define a conical shape (where the casing 14 is an engine mount ring for example).

The flange 16 extends perpendicularly from the body 26 at the second end 30 of the casing 14. In other examples, the flange 16 may extend from the body 26 at any position between the first end 28 and the second end 30 (including extending from the first end 28). Additionally, the flange 16 may not extend perpendicularly from the body 26 and may define any angle with the body 26.

The flange 16 may comprise the same material as the casing 14, or may comprise a different material to the casing 14. For example, where the casing 14 comprises a composite material, the flange 16 may comprise a metal.

Where the casing 14 comprises a composite material, the casing 14 has greatest strength (that is, ability to withstand an applied load without failure) in the direction parallel to the orientation of the layers of the casing 14. In other words, a composite material casing has greater strength for 'in-plane' loads than 'out of plane' loads). For example, the body 26 comprises a plurality of layers that are oriented parallel to the rotational axis 111 and consequently, the body 26 has greatest strength in a direction parallel to the rotational axis 111. By way of another example, the flange 16 comprises a plurality of layers that are oriented perpendicular to the rotational axis 111 and consequently, the flange 16 has greatest strength in a direction perpendicular to the rotational axis 111.

The component 22 may be any component of the gas turbine engine 110 that may be mounted on a casing of the gas turbine engine 110. For example, the component 22 may include the gearbox 133 and/or an engine accessory 136 such as a fuel pump or a hydro-mechanical unit (HMU).

The first and second connectors 18, 20 (which may also be referred to as first and second links) may be coupled to the component 22 at the same location on the component 22, or to different locations on the component 22. As illustrated in FIG. 2, the first and second connectors 18, 20 may be coupled to the component 22 at an end of the component 22. In other examples, the first and second connectors 18, 20 may be coupled to the component 22 at any position between the ends of the component 22. The third connector 24 is coupled to the component 22 at the end of the component 22 opposite to the first and second connectors 18, 20.

The first connector 18 is arranged to connect the component 22 to the casing 14 at a first location 32 on the casing 14 that is adjacent to the flange 16. The second connector 20 is also arranged to connect the component 22 to the casing 14 at a second location 34 on the casing 14 that is adjacent to the flange 16. The first location 32 and the second location 34 may be positioned along the longitudinal axis of the casing 14 at the same position. In other examples, the first location 32 and the second location 34 may be positioned at different positions along the longitudinal axis. In some examples, the first and second locations 32, 34 may be within five centimeters of the flange 16 along the longitudinal axis.

Figure 3:
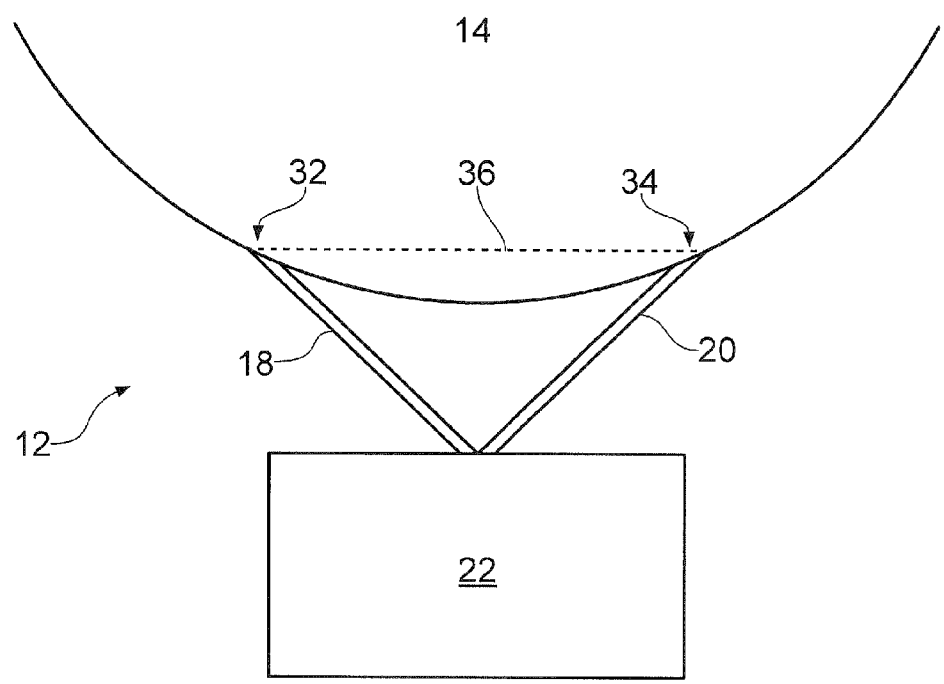
FIG. 3 illustrates a schematic front view of the apparatus illustrated in FIG. 3.

As illustrated in FIG. 3, where the casing 14 is the fan casing 141 or the core engine casing 139, the casing 14 may have a substantially circular cross section. The first and second locations 32, 34 may be on opposing sides of the casing 14 and define a chord there between (indicated by the dotted line 36).

The first and second connectors 18, 20 may be oriented to form tangents with the casing 14 at the first location 32 and the second location 34 respectively. In other words, the first connector 18 may define an angle with the surface of the casing 14 at the first location 32 that is equal to zero, or is close to zero (for example, the angle defined by the first and second connectors 18, 20 with the surface of the casing 14 at the first and second locations 32, 34 respectively may be less than thirty degrees, may be less than twenty degrees, or may be less than ten degrees). Similarly, the second connector 20 may define an angle with the surface of the casing 14 at the second location 34 that is equal to zero, or is close to zero (for example, the angle may be less than thirty degrees, may be less than twenty degrees, or may be less than ten degrees). Consequently, the first and second connectors 18, 20 may define a V shape between the component 22 and the casing 14.

The apparatus 12 may provide several advantages. Firstly, since the first and second locations 32, 34 are in close proximity to the flange 16, they are locations of relatively high strength and result in the component 22 being securely coupled to the casing 14. In particular, the apparatus 12 may advantageously enable the component 22 to be mounted to a thin walled structure (such as a fan casing for example) and may prevent, for example, a thin composite casing barrel deflecting inwards under load from the first and second connectors 18, 20. A thin walled structure may be defined as a wall having a thickness of less than 5 to 10% of the radius (a fan case may consequently be defined as a thin walled structure since it has a wall thickness of less than 0.5% of the radius).

Secondly, since the first and second connectors 18, 20 form tangents with the casing 14 at the first and second locations 32, 34 respectively, the vector of the load on the casing 14 from the component 22 is oriented substantially parallel to the surface of the casing 14 at the first and second locations 32, 34. Where the casing 14 comprises a composite material, this may advantageously result in the vector of the load being parallel to the direction of greatest strength of the casing 14 (i.e. the load is an 'in-plane' load rather than an 'out of plane' load). Consequently, the component 22 may be mounted on the casing 14 without an intervening mount rail between the first and second connectors 18, 20 and the casing 14 (where a mount rail is a separate member that reinforces the casing 14). The apparatus 12 may consequently be relatively light weight and low cost.

Figure 4:
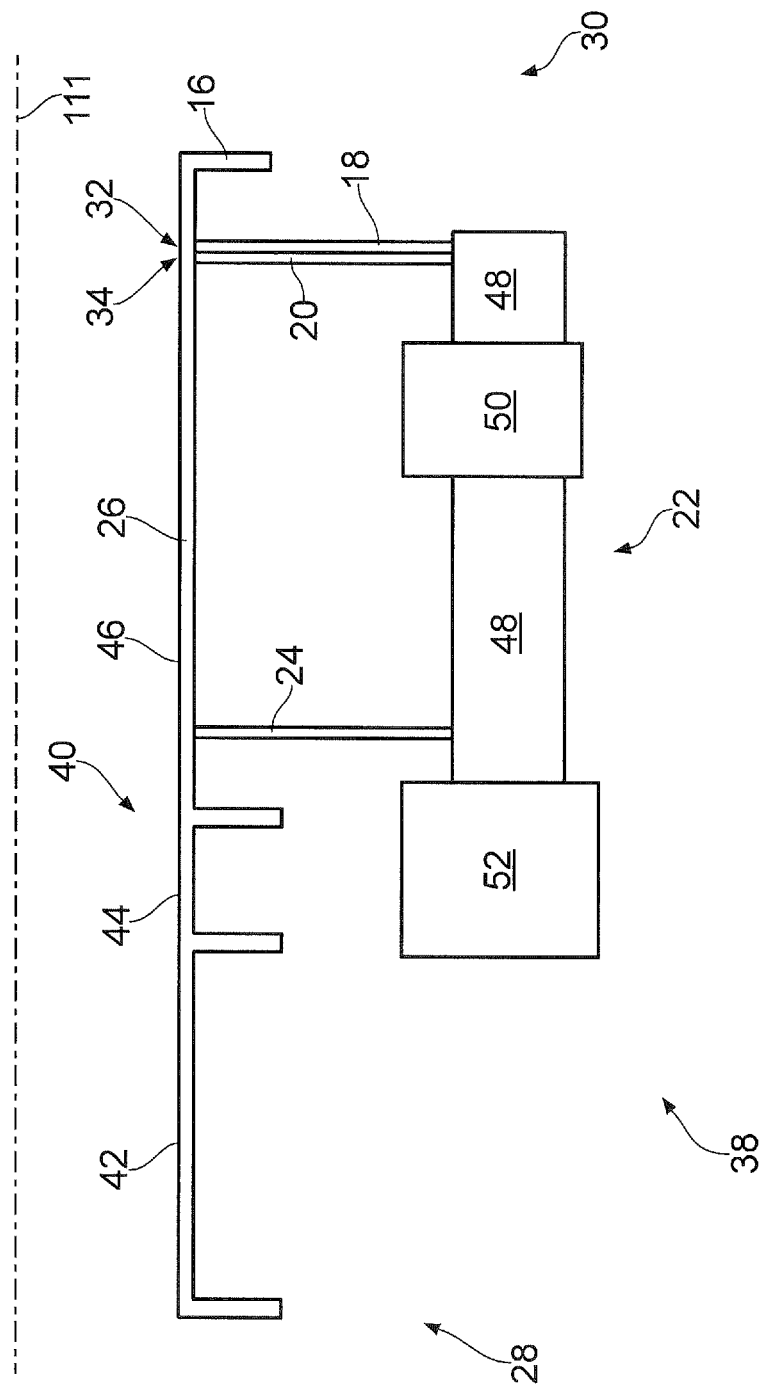
FIG. 4 illustrates a schematic cross sectional side view of a further apparatus for mounting a component in a gas turbine engine according to various examples.

FIG. 4 illustrates a schematic cross sectional side view of a further apparatus 38 for mounting a component 22 in a gas turbine engine 110 according to various examples. The apparatus 38 is similar to the apparatus 12 illustrated in FIGS. 2 and 3 and where the features are similar, the same reference numerals are used. The apparatus 38 includes a fan case 40, a gearbox 22, a first connector 18 and a second connector 20.

The fan case 40 includes a front fan case 42, outlet guide vanes 44, and a rear fan case 46. The front fan case 42, the outlet guide vanes 44 and the rear fan case 46 may comprise different materials. For example, the front fan case 42 and the outlet guide vanes 44 may comprise metals, whereas the rear fan case 46 may comprise a composite material. In another example, the rear fan case 46 may comprise a composite forward section with a titanium rear section and a composite section where the connectors 18, 20 couple to the fan case 40. The flange 16 extends from the rear fan case 46 at the second end 30 of the fan case 14.

The gear box 22 includes an accessory gearbox 48 (sometimes also referred to as an auxiliary gearbox or an external gearbox) and a transfer gearbox 50 that is positioned between the ends of the accessory gearbox 48. The gearbox 22 is coupled to a generator 52 to generate electrical energy when in operation.

The first and second connectors 18, 20 are connected to the accessory gearbox 48 at a location to the rear of the transfer gearbox 50 (i.e. the connection of the first and second connectors 18, 20 to the accessory gearbox 48 is positioned closer to the second end 30 of the fan case 40 than the transfer gearbox 50). The first and second connectors 18, 20 are connected to the rear fan casing 46 at the first and second locations 32, 34 respectively, adjacent to the flange 16. The first and second connectors 18, 20 may be oriented to form tangents with the rear fan case 46 at the first location 32 and the second location 34 respectively, as illustrated in FIG. 3.

The apparatus 38 may also include a third connector 24 to connect the accessory gearbox 48 to the fan case 40. As illustrated in FIG. 4, the third connector 24 is coupled to the accessory gearbox 48 at a location adjacent to the generator 52, and is coupled to the rear fan case 46 adjacent to the outlet guide vanes 44.

Figure 5:
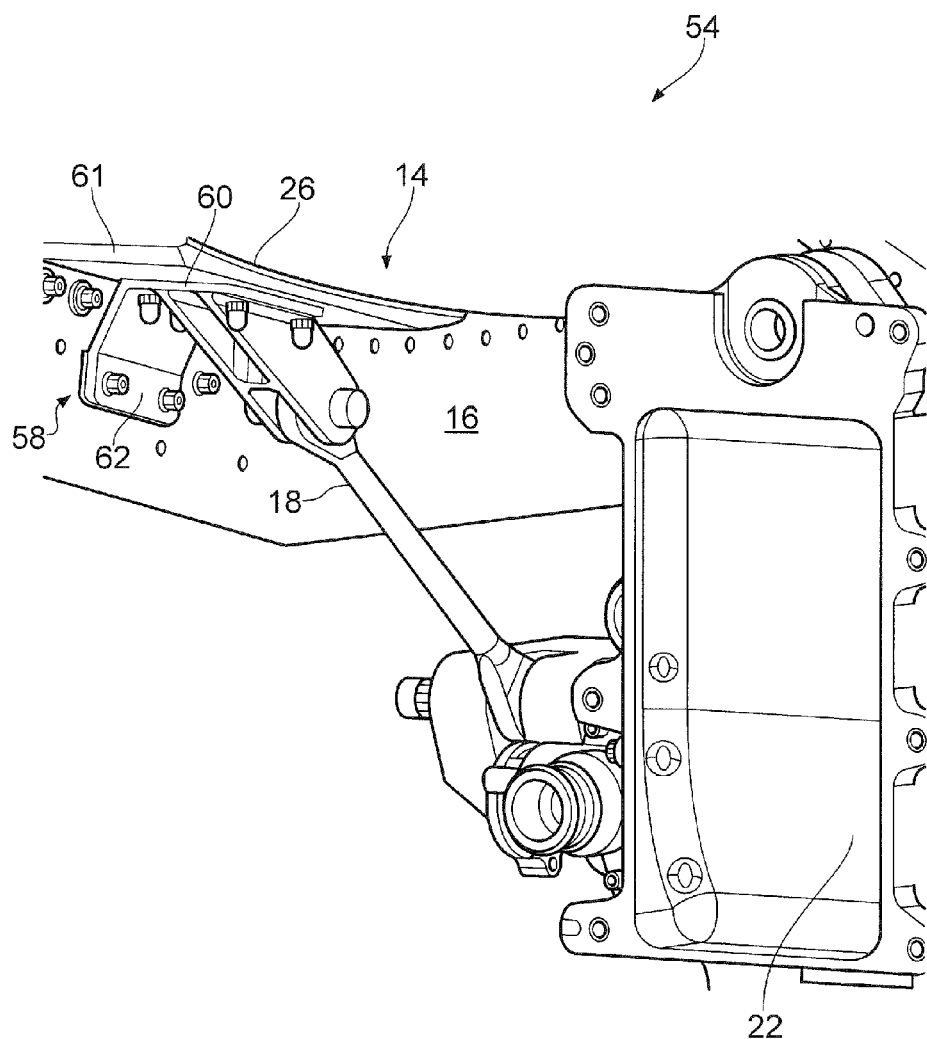
FIG. 5 illustrates a perspective view of another apparatus for mounting a component in a gas turbine engine according to various examples.

FIG. 5 illustrates a perspective view of another apparatus 54 for mounting a component 22 in a gas turbine engine 110 according to various examples. The apparatus 54 is similar to the apparatus 12 and the apparatus 38, and where the features are similar, the same reference numerals are used.

In this example, the first connector 18 is coupled to the casing 14 (which may be a rear fan case 46) via a bracket 58. The bracket 58 is 'L' shaped and includes a first part 60 fastened to a body 26 of the casing 14 (which may be fastened via an intervening pad 61 as illustrated in FIG. 5), and a second part 62 fastened to the flange 16 of the casing 14. In some examples, the bracket 58 is integral to the first connector 18. In other examples, the bracket 58 may be separate to the first connector 18 and may be fastened to the first connector 18 (via bolts for example).

It should be appreciated that the apparatus 54 may include a similar arrangement for the second connector 20 (i.e. the second connector 20 may be connected to the body 26 of the casing 14 and to the flange 16 via a bracket).

Figure 6:
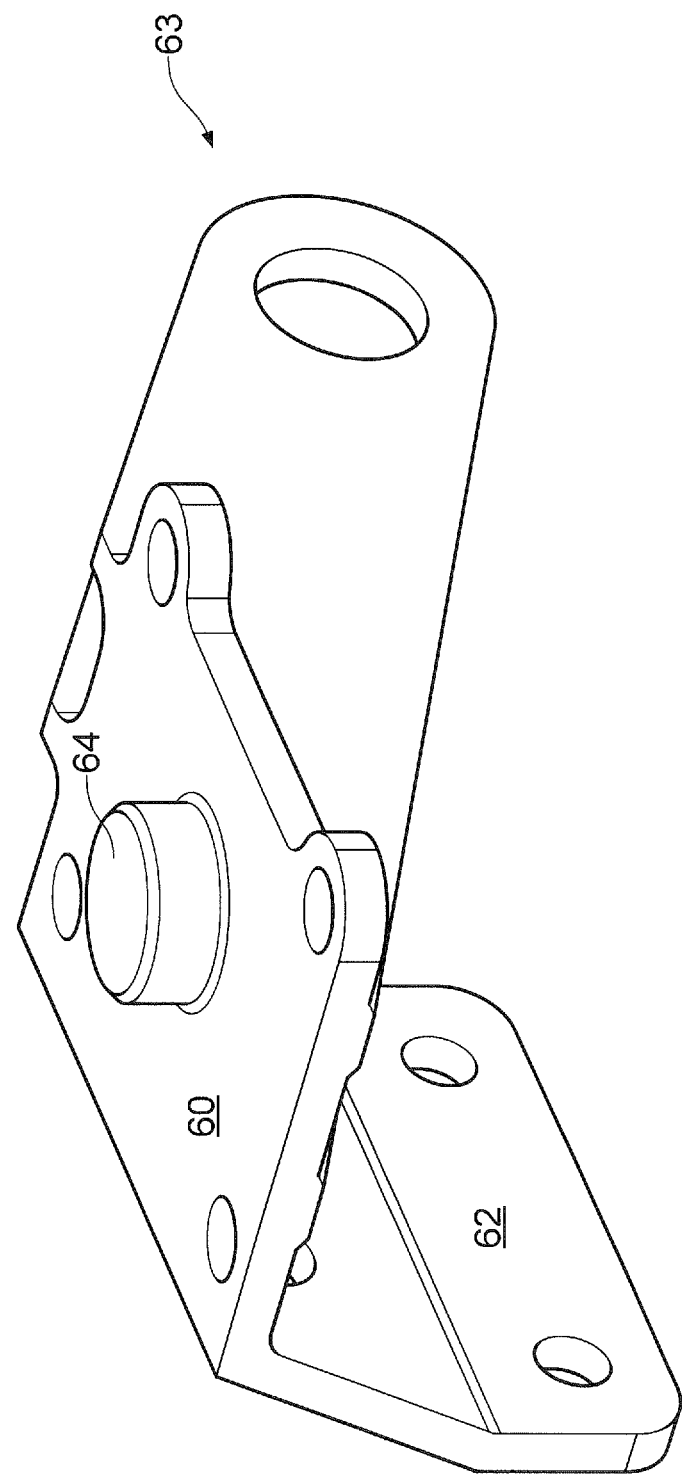
FIG. 6 illustrates a perspective view of a bracket according to various examples.

FIG. 6 illustrates a perspective view of a bracket 63 according to various examples. The bracket 63 is similar to the bracket 58 illustrated in FIG. 5 and where the features are similar, the same reference numerals are used.

The bracket 63 includes a protrusion 64 (which may comprise a large pin or a dowel) which extends from the first part 60 of the bracket 63. When assembled, the protrusion 64 protrudes from the bracket 63 and into a corresponding cavity in the casing 14 and may advantageously enable the bracket 63 to be located at a predetermined position on the casing 14. Additionally, the protrusion 64 may improve the coupling of the bracket 3 to the casing 14.

The apparatus 54 may provide an advantage in that by coupling the first connector 18 (and/or the second connector 20) to the casing 14 via a bracket 58, 63, the component 22 may be more securely fastened to the casing 14 due to the distribution of load on the casing 14 through the bracket 58, 63. In particular, the distribution of load through the flange 16 and through the body of the casing 14 may provide relatively secure, strong, fastening for the component 22. The bracket 58, 63 may enable use of the flange 16 to react residual loads that are out-of plane of the skin of the casing. This is achieved through the direct connection of the bracket 58, 63 to the flange 16. This may be beneficial because the direct connection to the flange 16 may enable increased angles of intersection of the first and second connectors 18, 20 with the casing skin and thereby reduce the length of the first and second connectors 18, 20. Additionally, the bracket 58, 63 may provide a relatively simple way to connect the first and second connectors 18, 20 to the casing (relative to an embodiment, without brackets, arranged so that the ends of the first and second connectors are sunk in to the casing which may lead to complexities in the manufacture of the casing).

It will be understood that the invention is not limited to the embodiments above-described and various modifications and improvements can be made without departing from the various concepts described herein. For example, the gas turbine engine 110 may comprise a different structure and may comprise a different number of compressor stages, turbine stages and interconnecting shafts.

Additionally, the gas turbine engine 110 may comprise any number of connectors 18, 20, some or all which being arranged as described in the preceding paragraphs, to couple a component of the gas turbine engine to a casing of the gas turbine engine.

Furthermore, in some examples, the first and second connectors 18, 20 may be connected to (or connected adjacent to) any locally reinforced section (such as, but not limited to, a flange) of the casing 14.

Except where mutually exclusive, any of the features may be employed separately or in combination with any other features and the invention extends to and includes all combinations and sub-combinations of one or more features described herein in any form.

What is claimed is:

1. An apparatus for mounting a component in a gas turbine engine, the apparatus comprising:
   a fan casing of a gas turbine engine, the fan casing including a body and a flange, the fan casing being made of a composite material;
   a first connector to connect the component of the gas turbine engine to the fan casing at a first location adjacent to the flange;
   a second connector to connect the component of the gas turbine engine to the fan casing at a second location adjacent to the flange; and
   a first bracket connected to the body and to the flange of the fan casing, the first connector being connected to the flange and to the body of the fan casing via the first bracket.

2. The apparatus as claimed in claim 1, wherein the fan casing has a circular cross section, the first location and the second location each being on opposing sides of the fan casing and defining a chord there between.

3. The apparatus as claimed in claim 1, wherein the fan casing has a longitudinal axis, the first location being within five centimeters of the flange along the longitudinal axis of the fan casing.

4. The apparatus as claimed in claim 1, wherein the fan casing has a first end and an opposite second end, the flange being positioned at the second end of the fan casing.

5. The apparatus as claimed in claim 1, wherein the first connector and the second connector are arranged to connect the component to the fan casing without an intervening mount rail.

6. The apparatus as claimed in claim 1, wherein the component includes a gearbox for the gas turbine engine.

7. A gas turbine engine comprising the apparatus as claimed in claim 1.

8. The apparatus as claimed in claim 1, wherein the first bracket includes a protrusion that extends from a first part of the first bracket, the protrusion protruding from the first bracket and into a corresponding cavity in the fan casing.

9. The apparatus as claimed in claim 1, wherein
   the first connector and the second connector are oriented to form tangents with the fan casing at the first location and the second location respectively.

* * * * *